(12) United States Patent
Nair

(10) Patent No.: US 11,874,654 B2
(45) Date of Patent: Jan. 16, 2024

(54) SYSTEM, APPARATUS AND METHOD OF CONDITION BASED MANAGEMENT OF ONE OR MORE ELECTRO-MECHANICAL SYSTEMS

(71) Applicant: Siemens Aktiengesellschaft, Munich (DE)

(72) Inventor: P. V. Sudev Nair, Bangalore (IN)

(73) Assignee: Siemens Aktiengesellschaft, Munich (DE)

( * ) Notice: Subject to any disclaimer, the term of this patent is extended or adjusted under 35 U.S.C. 154(b) by 68 days.

(21) Appl. No.: 17/619,735

(22) PCT Filed: Jun. 26, 2020

(86) PCT No.: PCT/EP2020/068135
§ 371 (c)(1),
(2) Date: Dec. 16, 2021

(87) PCT Pub. No.: WO2020/260657
PCT Pub. Date: Dec. 30, 2020

(65) Prior Publication Data
US 2022/0299988 A1 Sep. 22, 2022

(30) Foreign Application Priority Data
Jun. 27, 2019 (EP) ..................................... 19182938

(51) Int. Cl.
*G05B 23/02* (2006.01)
*B60W 30/184* (2012.01)

(52) U.S. Cl.
CPC ....... *G05B 23/0283* (2013.01); *B60W 30/184* (2013.01)

(58) Field of Classification Search
CPC .......................... G05B 23/0283; B60W 30/184
See application file for complete search history.

(56) References Cited

U.S. PATENT DOCUMENTS

2009/0281768 A1* 11/2009 Fitzgerald ............... G06F 30/23
702/42
2014/0379199 A1 12/2014 Schulz et al.
(Continued)

FOREIGN PATENT DOCUMENTS

EP 3462264 A1 4/2019

OTHER PUBLICATIONS

International Search Report and the Written Opinion for International Patent Application PCT/EP2020/068135 dated Sep. 23, 2020.

*Primary Examiner* — John E Breene
*Assistant Examiner* — Xiuqin Sun
(74) *Attorney, Agent, or Firm* — Lempia Summerfield Katz LLC

(57) ABSTRACT

Systems, devices, and methods of condition-based management of electro-mechanical systems are disclosed. The method includes generating a stress profile for the electro-mechanical system based on operating or simulating operation of the electro-mechanical system in accordance with a load profile, wherein the load profile indicative of operation duration and load capacity of the electro-mechanical system. The method further includes receiving condition data associated with the electro-mechanical system in operation from a plurality of sensing units and predicting a failure instance of the electro-mechanical system using an accelerated degradation model based on at least one of the stress profile and the condition data. The accelerated degradation model is generated when the electro-mechanical system is operated above a rated stress. The method further includes comparing the predicted failure instance with an actual failure instance upon failure of the electro-mechanical system, for tuning the accelerated degradation model.

14 Claims, 7 Drawing Sheets

(56) References Cited

U.S. PATENT DOCUMENTS

2017/0323240 A1\* 11/2017 Johnson ................. G06Q 10/04
2019/0102494 A1\*  4/2019 Mars ....................... G06F 30/20
2020/0310397 A1\* 10/2020 Hande ................... G06Q 10/04

\* cited by examiner

SYSTEM, APPARATUS AND METHOD OF CONDITION BASED MANAGEMENT OF ONE OR MORE ELECTRO-MECHANICAL SYSTEMS

The present patent document is a § 371 nationalization of PCT Application Serial No. PCT/EP2020/068135, filed Jun. 26, 2020, designating the United States, which is hereby incorporated by reference, and this patent document also claims the benefit of European Patent Application No. 19182938.1, filed Jun. 27, 2019, which is also hereby incorporated by reference.

TECHNICAL FIELD

The present disclosure relates to condition-based management of one or more electro-mechanical system.

BACKGROUND

Electro-mechanical systems undergo multiple types of stresses. The stresses include mechanical stress, electrical stress, process stress, etc. Life of the electro-mechanical systems depends on the stresses. Failure may be initiated when the stress exceeds strength of the electro-mechanical systems. The stresses may have varying impact on the electro-mechanical system. For example, electric stress may reduce life of stator insulation or winding. Mechanical stress may reduce life of bearing, reduces fatigue strength of rotor, etc. Process stress may reduce life of rotor.

The variation in impact may be difficult to estimate. Especially when the stresses act together, estimating life of the electro-mechanical system may be difficult and may lead to inaccurate predictions.

There exist techniques to predict life of the electro-mechanical systems that perform condition-based maintenance of downhole systems and equipment, including drilling tools, wireline tools, and production tools. The condition-based maintenance considers varying stress levels in the systems. However, such prediction may not consider a combined effect of different types of stresses.

SUMMARY AND DESCRIPTION

The scope of the present disclosure is defined solely by the appended claims and is not affected to any degree by the statements within this summary. The present embodiments may obviate one or more of the drawbacks or limitations in the related art.

According to a first aspect of the present disclosure, a method for condition-based management of the electro-mechanical system. The method includes generating a stress profile for the electro-mechanical system based on operating or simulating operation of the electro-mechanical system in accordance with a load profile. The load profile is indicative of operation duration and load capacity of the electro-mechanical system. The method further includes receiving condition data, associated with the electro-mechanical system in operation, from a plurality of sensing units. The method includes predicting a failure instance of the electro-mechanical system using an accelerated degradation model based on at least one of the stress profile and the condition data. The accelerated degradation model is generated when the electro-mechanical system is operated above a rated stress. The method also includes comparing the predicted failure instance with an actual failure instance upon failure of the electro-mechanical system for tuning the accelerated degradation model.

As used herein, the stress profile refers to a distribution of stress of the electro-mechanical system during operation or during simulation of the operation. The simulation of the operation may be performed on a digital twin of the electro-mechanical system.

The method may include determining an accelerated-mechanical response from the electro-mechanical system. The accelerated-mechanical response includes condition data that reflect a mechanical fault in the electro-mechanical system. The mechanical fault includes misalignment of components of the electro-mechanical system and/or loss of structural integrity of the components. The method may include simulating the mechanical fault on the digital twin to determine the accelerated-mechanical response.

The method may include determining an accelerated-electrical response from the electro-mechanical system. The accelerated-electrical response includes the condition data that reflect an electric fault in the electro-mechanical system. The electric fault includes at least one of high voltage, low voltage, high current, electric phase unbalance, low current, and short-circuit. The method may include simulating the electric fault on the digital twin to determine the accelerated-electric response.

The method may include determining an accelerated-process response from the electro-mechanical system. The accelerated-process response includes the condition data that reflect a process fault due to overload of the electro-mechanical system. The method may include simulating the process fault on the digital twin to determine the accelerated-process response.

As used above, the mechanical fault, the electric fault, and the process fault reflect a condition of the electro-mechanical system operating beyond the rated stress.

The method may include generating the digital twin including a cumulative damage model of the electro-mechanical system. The digital twin may be generated by computing a life probability distribution for the electro-mechanical system. Further, the digital twin may be generated by determining a time-damage accumulation of electro-mechanical system based on historical condition data of the electro-mechanical system.

The method may include generating component replica of components of the electro-mechanical system. The component replica is generated based on a time-damage accumulation for the components. In an embodiment, the component replica is generated using Weibull distribution and using inverse power law relationship.

The method may include generating simulation instances by simulating the accelerated-mechanical response, the accelerated-electrical response, and the accelerated-process response on the digital twin of the electro-mechanical system. The simulated instances are used to generate the accelerated degradation model.

The method includes predicting the failure instance of the electro-mechanical system using the accelerated degradation model. The stress profile and the condition data are applied to the accelerated degradation model to predict the failure instances. In an embodiment, the failure instance is predicted by determining a fraction of the electro-mechanical system or its components that are failing with respect to time under stress (e.g., value determined from the stress profile).

The method may include predicting an accelerated remaining life of the electro-mechanical system. The accelerated remaining life includes cycles to failure when the electro-mechanical system is operated above the rated stress.

The method may include predicting a remaining life based on the accelerated remaining life and physics of failure of the electro-mechanical system. The remaining life includes cycles to failure when the electro-mechanical system is operated within the rated stress.

The method includes comparing the predicted failure instance with the actual failure instance upon failure of the electro-mechanical system, for tuning the accelerated degradation model.

The method may include tuning coefficients of the accelerated degradation model based on the comparison of the predicted failure instance and the actual failure instance. In an embodiment, the comparison is perform using machine learning algorithms such as regression algorithm and genetic algorithm. For example, a genetic algorithm is used to converge on difference between the predicted failure instance and the actual failure instance by performing the acts of mutation, recombination, and selection. The method may include predicting a new remaining life based on the tuned accelerated degradation model.

The method may include predicting a fleet life of a fleet of electro-mechanical systems using the accelerated degradation model. The method may include updating the fleet life using a neural network based on variability between the electro-mechanical systems in the fleet.

A second aspect of the present disclosure is an apparatus for condition-based management of an electro-mechanical system. The apparatus includes one or more processing units and a memory unit communicative coupled to the one or more processing units. The memory unit includes a condition module stored in the form of machine-readable instructions executable by the one or more processing units, wherein the condition module is configured to perform one or more method acts described hereinabove.

A third aspect of the present disclosure is a system including one or more devices capable of providing condition data associated with condition of one or more electro-mechanical systems and a server communicatively coupled to the one or more devices, wherein the server including a condition module is configured to perform condition-based management of one or more electro-mechanical systems.

The object is achieved by a fourth aspect of the present disclosure. The fourth aspect is a computer-program product having machine-readable instructions stored therein, which when executed by a processor, cause the processor to perform a method as describe above.

BRIEF DESCRIPTION OF THE DRAWINGS

The above-mentioned and other features of the disclosure will now be addressed with reference to the accompanying drawings. The illustrated embodiments are intended to illustrate, but not limit the disclosure.

The present disclosure is further described hereinafter with reference to illustrated embodiments shown in the accompanying drawings, in which.

DETAILED DESCRIPTION

Figure 1:
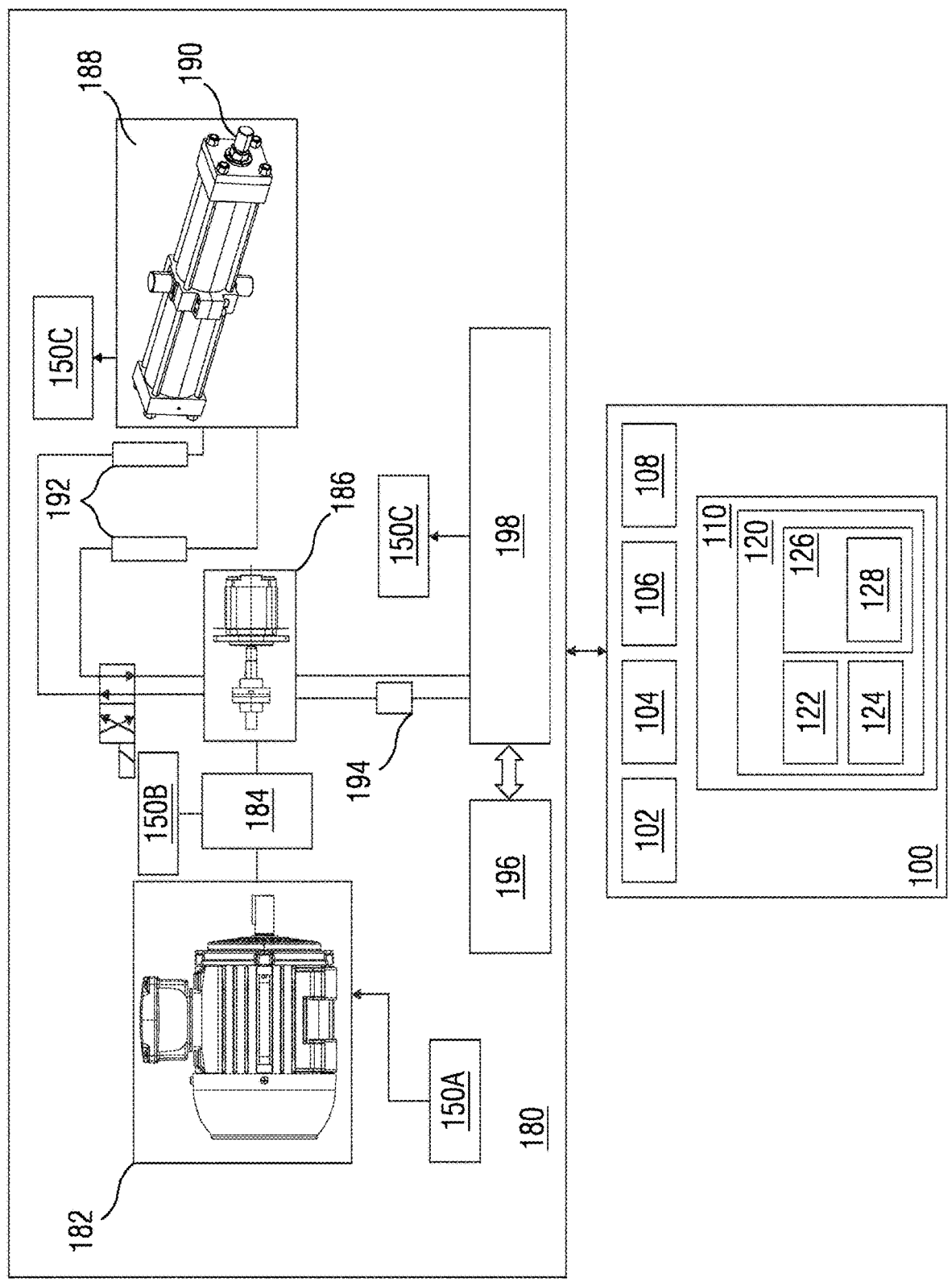
FIG. 1 illustrates an apparatus for condition-based management of an electro-mechanical system, according to an embodiment.

Hereinafter, embodiments for carrying out the present disclosure are described in detail. The various embodiments are described with reference to the drawings, wherein like reference numerals are used to refer to like elements throughout. In the following description, for purpose of explanation, numerous specific details are set forth in order to provide a thorough understanding of one or more embodiments. It may be evident that such embodiments may be practiced without these specific details.

As used herein, the term "accelerated" refers to a condition where an electro-mechanical system is operated above a rated stress prescribed for the system. The "accelerated" condition is different from a "normal" condition where the electro-mechanical system is operated within the rated stress. The rated stress may be prescribed at the manufacture of the electro-mechanical system in a catalogue.

FIG. 1 illustrates an apparatus 100 for condition-based management of an electro-mechanical system 180, according to an embodiment. The electro-mechanical system 180 includes a motor 182, a coupler 184, a pump 186, and a hydraulic cylinder 188 with load cell 190. The electro-mechanical system 180 also includes flow control valves 192, suction valves 194, an oil chiller 196, and a return line filter 198. The change in direction of the flow control values 190 and 192 is used to change direction of a fluid in the electro-mechanical system 180. The load cell 190 is used to continuously track load on the electro-mechanical system 180 based on fluid pressure of the fluid.

The electro-mechanical system 180 is subject to accelerated stresses beyond a rated stress. The term "rated stress" is a measure of stress that is prescribed for the electro-mechanical system. The accelerated stresses are applied in the form of electric stress 150A, mechanical stress 150B and process stress 150C. For example, electric stress 150A may be caused through electrical faults, (e.g., high/low voltage or short circuit to the motor 182). Mechanical stress 150B may be caused through mechanical faults such as misalignment of coupler 184 of the electro-mechanical system 180. Process stress 150C may be caused through a process fault through clogging of in line and return line filters. Further, the process stress 150C may be due to a load profile input to the electro-mechanical system 180.

The apparatus 100 includes a processing unit 102, a communication unit 104, a display 106, and a sensing unit 108. The apparatus 100 also includes a memory unit 110 including machine readable instructions stored in the form of machine-readable instructions executable by the one or more processing units, wherein the fault detection module is configured to perform method acts described above. The execution of the fault detection module may also be performed using co-processors such as Graphical Processing Unit (GPU), Field Programmable Gate Array (FPGA), or Neural Processing/Compute Engines.

The memory unit 110 includes a condition module 120. The condition module 120 further includes a stress profile generator 122, a digital twin module 124, a degradation module 126, and a prediction module 128. The operation of the condition module 120 is explained with reference to FIG. 2.

Figure 2:
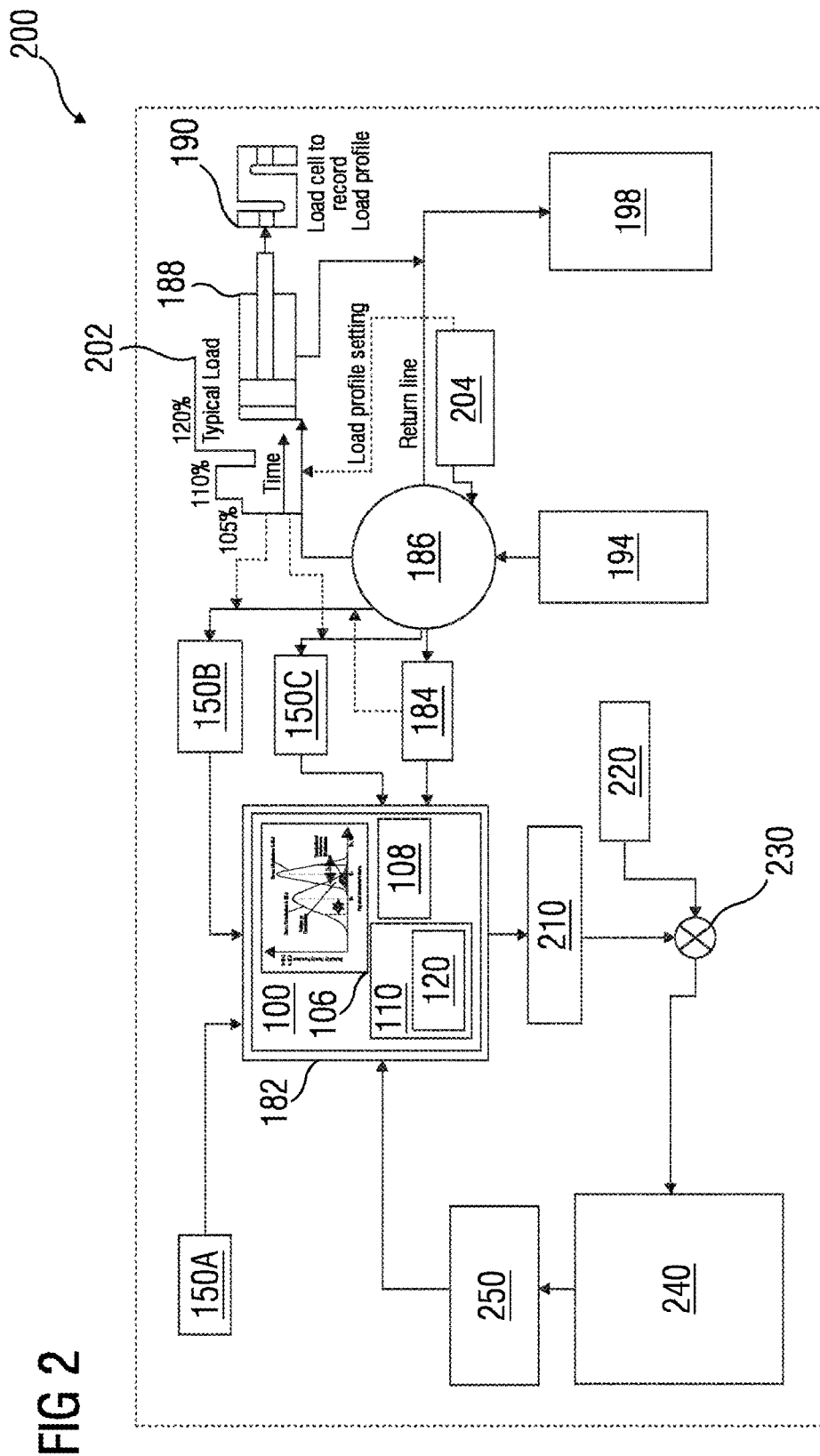
FIG. 2 illustrates the process for condition-based management of the electro-mechanical system of FIG. 1, according an embodiment.

FIG. 2 illustrates the process 200 for condition-based management of the electro-mechanical system 180 of FIG. 1. The stress profile generator 122 is configured to generate a stress profile for the electro-mechanical system 180 in accordance with a load profile 202. The load profile 202 is generated using a pressure relief function 204 to generate different load stresses on the electro-mechanical system 180. The load profile 202 may also be generated by monitoring power/current drawn by the electro-mechanical system 180. The load stress is generated by changing operation duration and load capacity of the electro-mechanical system 180.

As shown in FIG. 2, the electric stress 150A is generated by electric phase unbalance or by causing high or low voltage in the motor 182. The unbalance or high/low voltage will cause electric stress 150A on stator winding by increasing thermal as well as electrical current density. Further, the process stress 150C is generated based on faults during operation of the suction valve 194 or closure of return line filter 198. In addition, the load profile 202 also contributes to the mechanical stress 150B and process stress 150C.

The mechanical stress 150B is generated due to anomalies in the coupler 184 and/or the pump 186. For example, misalignment in the coupler may generate the mechanical stress 150B. In another example, if belt driven electro-mechanical system 180 is used then increased belt load will also invoke stress at a shaft of the motor 182. In yet another example, unbalance or eccentricity in a rotor of the motor 182 may cause the mechanical stress 150B.

Figure 3:
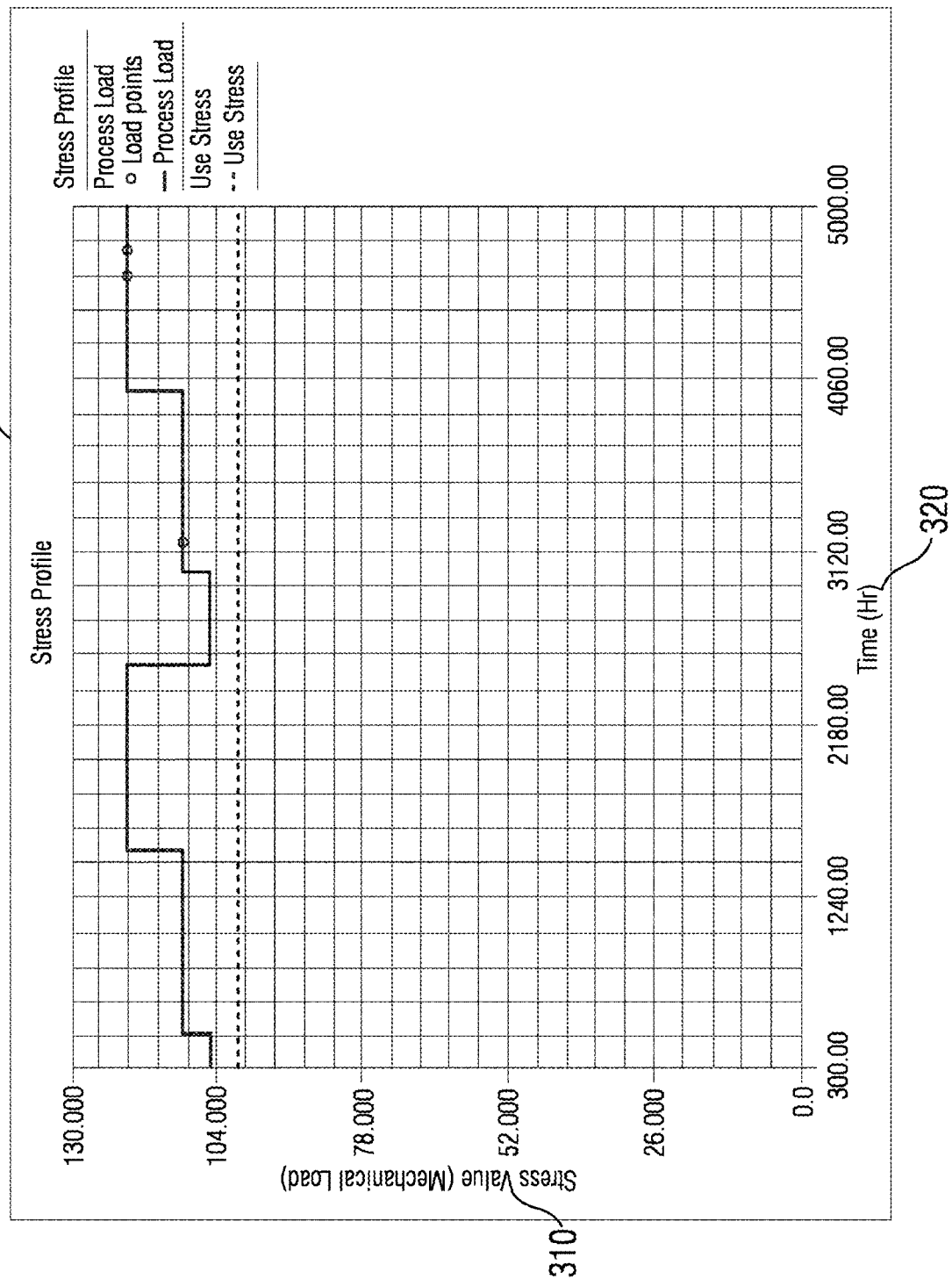
FIG. 3 illustrates an accelerated response from the electro-mechanical system in FIG. 1, according an embodiment.

FIG. 3 illustrates an accelerated response 300 from the electro-mechanical system 180. The y-axis 310 indicates a measure of stress in terms of electric stress, mechanical stress, and process stress. The x-axis 320 indicates time in terms of hours. Accordingly, the accelerated response 300 is a combination of the accelerated-mechanical response, the accelerated-electric response, and the accelerated-process response. The accelerated response 300 is generated by simulating the stress profile generated by the stress profile generator 122 for the electro-mechanical system 180.

The sensing units 108 measure operating parameters associated with the electro-mechanical system 180. For example, the sensing units may include thermal imaging devices, vibration sensors, current, flux and voltage sensors, etc. The measure operating parameters are referred as condition data associated with the electro-mechanical system 180. The condition data of the electro-mechanical system 180 generated during its operation is received by the digital twin module 124.

The digital twin module 124 is configured to determine Key Performance Indicators (KPI) associated with the electric stress 150A, mechanical stress 150B, and process stress 150C. The KPIs are obtained based on finite element-based simulation and is tuned based on machine-learning algorithms.

The digital twin module 124 is further configured to generate a digital twin of the electro-mechanical system 180. The digital twin includes a cumulative damage model and is generated by computing a life probability distribution for the electro-mechanical system 180. Further, a time-damage accumulation of electro-mechanical system 180 is determined based on historical condition data of the electro-mechanical system 180. In an embodiment, the digital twin of the electro-mechanical system 180 includes component replicas. An example of a coupler replica 400 is illustrated in FIG. 4.

Figure 4:
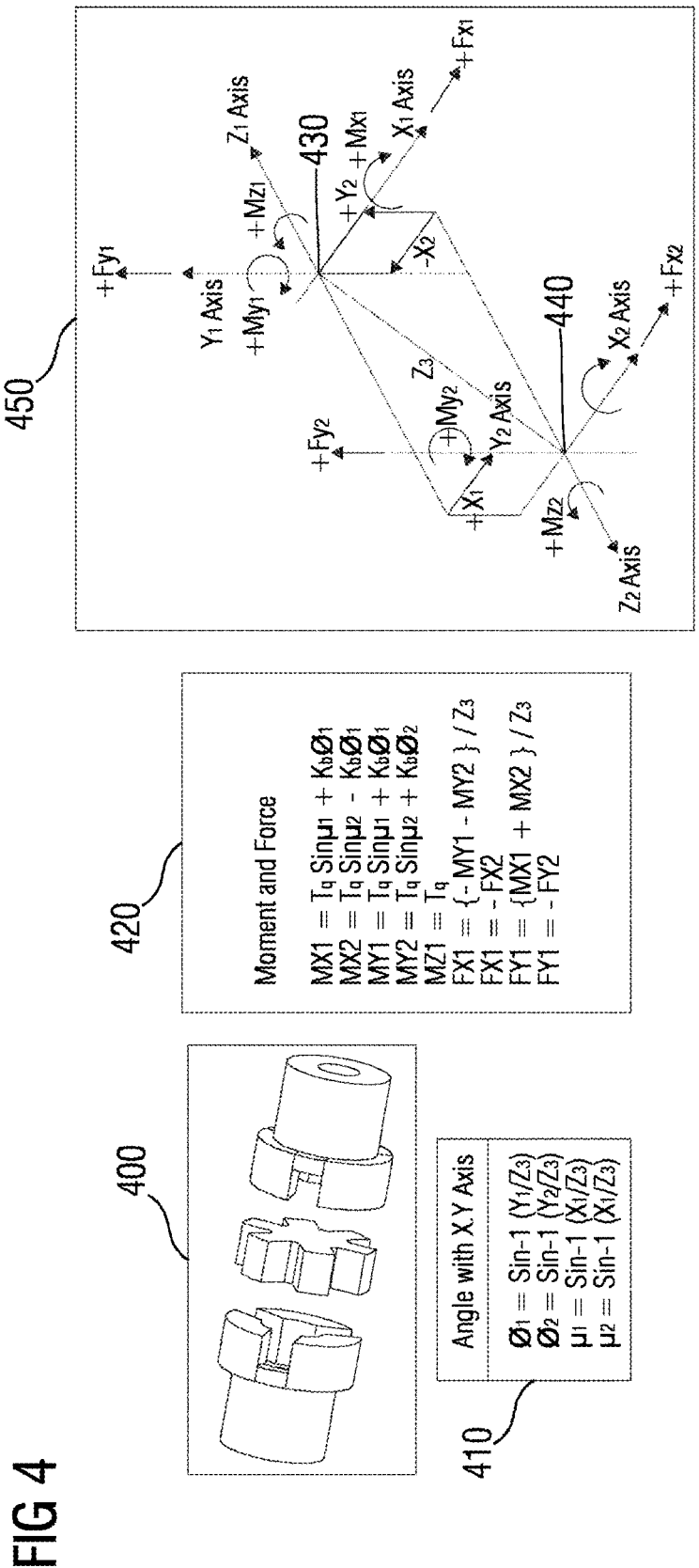
FIG. 4 illustrates a component replica of a digital twin of the electro-mechanical system in FIG. 1, according an embodiment.

FIG. 4 illustrates the coupler replica 400 of the digital twin of the electro-mechanical system 180. The coupler replica 400 is generated based on angles made with respect to X and Y axes 410, moment and force 420 determined using a coupling model 450. The coupling model 450 illustrates moment and force determined for X, Y and Z axes. The coupling model 450 may be used to determine moment and force for varying levels of misalignment.

In an embodiment, the angle made with X and Y axes 410 is determined as follows:

$$\phi_1 = \text{Sin}^{-1}(\Delta Y_1 / Z_3)$$

$$\phi_2 = \text{Sin}^{-1}(\Delta Y_2 / Z_3)$$

$$\theta_1 = \text{Sin}^{-1}(\Delta X_1 / Z_3)$$

$$\theta_2 = \text{Sin}^{-1}(\Delta X_2 / Z_3)$$

wherein: $\phi$ is misalignment angle in Y axis;
$\theta$ is misalignment angle in X axis;
$\Delta X_1$, $\Delta Y_1$ refers to misalignment in X and Y axes at node 1 430;
$\Delta X_2$, $\Delta Y_2$ refers to misalignment in X and Y axes at node 2 440; and
$Z_3$ refers to a center of articulation.

Further, the moment and force 420 is determined as follows:

$$MX1 = T_q \text{Sin}\theta_1 + K_b\phi_1$$

$$MX2 = T_q \text{Sin}\theta_2 - K_b\phi_2$$

$$MY1 = T_q \text{Sin}\phi_1 + K_b\theta_1$$

$$MY2 = T_q \text{Sin}\phi_1 + K_b\theta_2$$

$$MZ1 = T_q$$

$$FX1 = [-MY1 - MY2]/Z3$$

$$FX2 = -FX1$$

$$FY1 = [MX1 + MX2]/Z3$$

$$FY2 = -FY1$$

wherein: MX1 and MX2 are reaction moments;
$T_q$ is torque; and
$K_b$ is Bending spring rate.

Referring back to FIGS. 1 and 2, the degradation module 126 is configured to generate an accelerated degradation model based on the digital twin of the electro-mechanical system 180. The accelerated degradation model is generated by generating simulation instances by simulating an accelerated-mechanical response, an accelerated-electrical response, and an accelerated-process response on the digital twin of the electro-mechanical system 180.

The degradation module 126 includes the prediction module 128. The prediction module 128 is configured to predict failure instances and remaining life (cumulatively referred as 210) of the electro-mechanical system 180 using the accelerated degradation model based on at least one of the stress profile and the condition data. The stress profile and the condition data are mapped to the failure instances & the remaining life 210 using machine learning techniques.

The failure instances and remaining life 210 are compared with test results of actual failure instances and actual remaining life (cumulatively referred as 220). The comparator 230 is an illustration indicative of the operation performed in the degradation module 126. The blocks 240 and 250 are operations performed by the degradation module based on the comparison. At block 240, tuning coefficients are determined based on the load cycle, boundary conditions and finite element simulation of the electro-mechanical system 180. The tuning coefficients are applied to the accelerated degradation model at block 250.

The predicted failure instance 210 may be displayed on the display 106. In an embodiment, stress verses strength of the electro-mechanical system 180 is displayed. In another embodiment, remaining life for accelerated stress and normal stress is displayed. The prediction module 128 is configured to predict an accelerated remaining life of the electro-mechanical system 180. The accelerated remaining life includes cycles to failure when the electro-mechanical system is operated above the rated stress. Further, the prediction module 128 is configured to predict a remaining life based on the accelerated remaining life and physics of failure of the electro-mechanical system 180. The remaining life includes cycles to failure when the electro-mechanical system 180 is operated within the rated stress.

Figure 5:
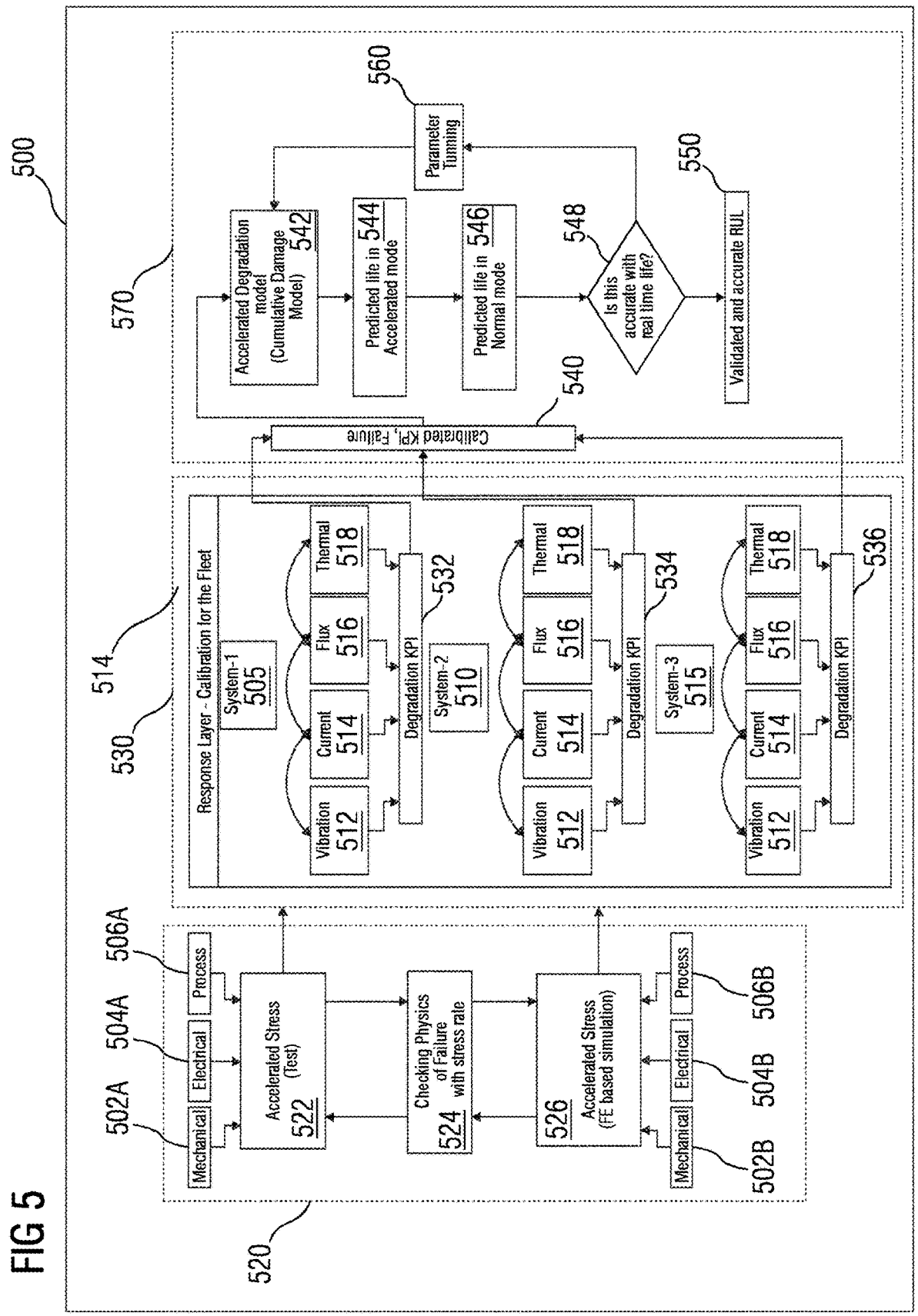
FIG. 5 is a flowchart illustrating a method for condition-based management of a fleet of electro-mechanical systems, according an embodiment.
Figure 6:
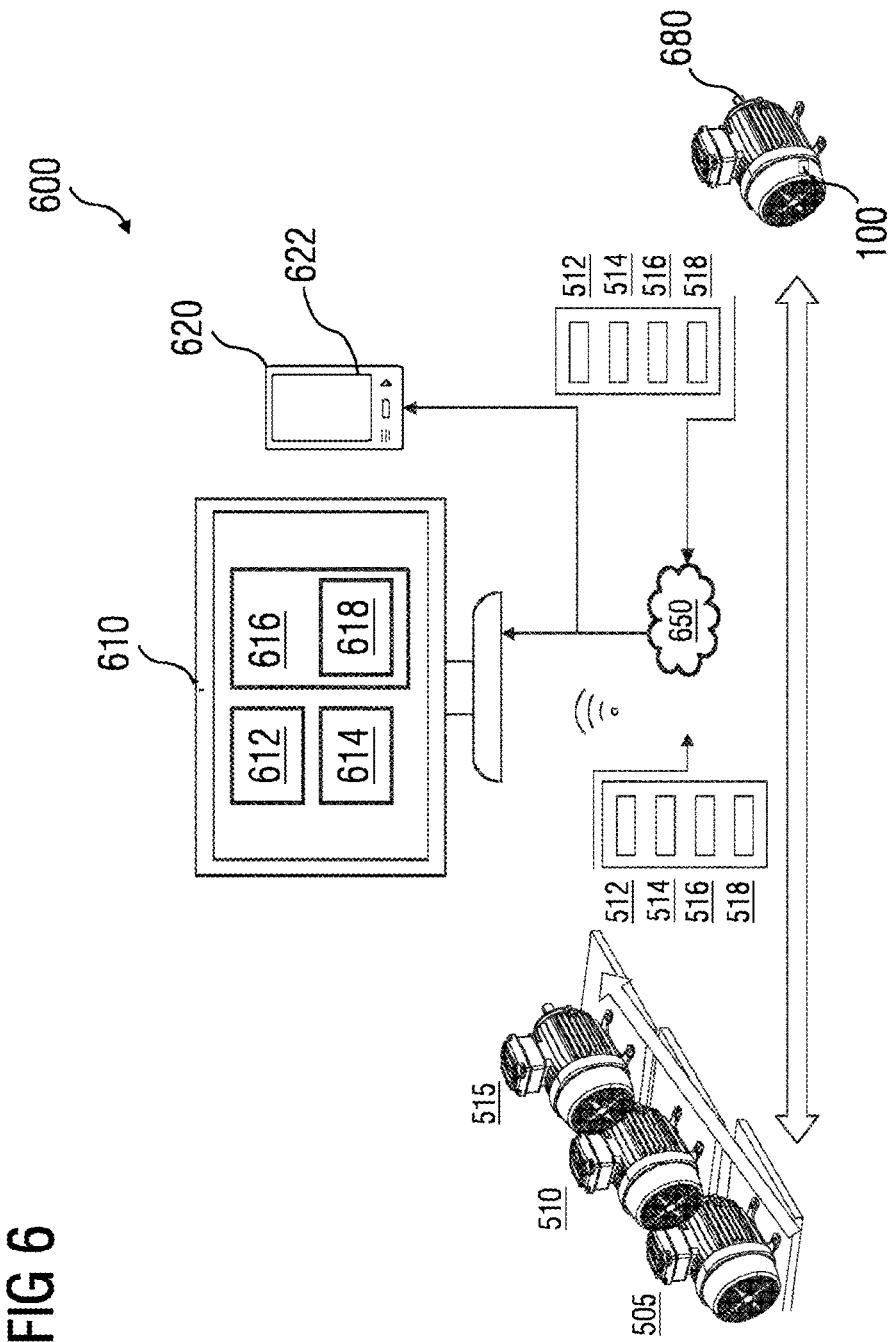
FIG. 6 illustrates a system to perform the method in FIG. 5, according an embodiment.

FIGS. 5 and 6 are associated with method 500 and system 600 to perform condition-based management of a fleet of electro-mechanical systems. Similar numerals in the FIGs may be used.

FIG. 5 is a flowchart illustrating a method for condition-based management of a fleet of electro-mechanical systems 505, 510, 515. For the purpose of FIG. 5, mechanical stress 502A refers to accelerated test mechanical stress applied in real-time, for example, on a test setup of a first electro-mechanical system (similar to the system 180). Mechanical stress 502B refers to accelerated simulated mechanical stress. Similarly, electric stress 504A is accelerated test electrical stress and 504B is accelerated simulated electric stress. Also, element 506A is an accelerated test process stress and element 506B is an accelerated simulation process stress. Further, condition data from the fleet 505, 510, 515 and the first electro-mechanical system is received in terms of vibration 512, current 514, flux 516, and temperature 518.

The method 500 include three stages 520, 530, and 570. At stage 520, a first accelerated degradation model is generated for the first electro-mechanical system. At stage 530, condition data from the fleet 505, 510, 515 is received and analysed. At stage 570, failure instances for the fleet 505, 510, 515 and remaining fleet life is determined.

The method 500 is elaborated as follows. At act 522, an accelerated test response is determined. The accelerated test response is determined based on condition data from the first electro-mechanical system received when test stress of 502A, 504A, and 506A are applied.

At act 524, the physics of failure of the first electro-mechanical system is compared with the accelerated test response. The physics of failure is a design limit of the first electro-mechanical system. The comparison is to provide the test stress of 502A, 504A, and 506A do not exceed the design limit.

At act 526, the accelerated degradation model is generated based on a digital twin of the first electro-mechanical system. The digital twin may include a cumulative damage model for the first electro-mechanical system, generated using Weibull distribution. The accelerated degradation model is generated by simulating the stress 502B, 504B, and 506B on the digital twin. Accordingly, the accelerated degradation model includes simulation response with respect to the stress 502B, 504B, and 506B.

At act 532, a stress profile for system 505 of the fleet is generated. The stress profile is generated based on vibration 512, current 514, flux 516, and temperature 518 from the system 505. Similarly, at act 534, a stress profile for system 510 of the fleet is generated. Also, at act 536, a stress profile for system 515 of the fleet is generated.

At act 542, the stress profiles for the fleet 505, 510, and 515 are input to the accelerated degradation model. At act 544, the remaining fleet life is predicted during normal operation cycle based on the accelerated degradation model. In an embodiment, the normal operation cycle is when the stress 502A, 504A, and 506A are within a rated stress. The rated stress is known based on the design limit of the fleet 505, 510, and 515. In an embodiment, the remaining fleet life is predicted based on Basquin equation.

At act 542, failure instances associated with the fleet 505, 510, and 515 are predicted. The failure instances may be predicted using Weibull distribution generated for the fleet 505, 510 and 515. The Weibull distribution has a scale parameter $\eta$ that may be expressed as an inverse power function of stress V in the stress profile.

$$\eta(V) = \frac{1}{KV^n}$$

wherein K and n are coefficients of the Weibull distribution.

The failure instances associated with the fleet 505, 510 and 515 may be determined with respect to time t. In an embodiment the determination is performed for constant stress V.

$$F(t;V) = 1 - R(t;V)$$

wherein: F is a cumulative distribution function that indicates unreliability; and $$R(t;V) = e^{-\left[\frac{t}{\eta(V)}\right]^{\beta}}$$

wherein: R is a measure of reliability associated with the fleet 505, 510 and 515 under
the stress V; and
$\beta$ is a coefficient of the Weibull distribution.

With change in stress, for example $S_1$, $S_2$ and $S_3$ the cumulative distribution function also changes. In an embodiment, the cumulative distribution functions $F_1$, $F_2$ and $F_3$ are determined as follows:

$$F_1(t; S_1) = 1 - e^{-[KS_1^n t]^{\beta}}$$

$$F_2(t; S_2) = 1 - e^{-[KS_2^n t]^{\beta}}$$

$$F_3(t; S_3) = 1 - e^{-[KS_3^n t]^{\beta}}$$

The cumulative distribution functions $F_1$, $F_2$, and $F_3$ is used to predict failure instances at time t. If the fleet 505, 510, and 515 does not fail at time t, then the cumulative distribution function considers the damage accumulated till time t.

The cumulative distributed function is updated accordingly. Therefore, the aforementioned equation is updated with equivalent age. Considering stress $S_2$ is applied, the equation is updated as follows:

$$F_2(t;S_2)=1-e^{-[KS_2^n((t-t_1)+\epsilon_1)]^\beta}$$

wherein: $\epsilon_1$ is the equivalent age after time $t_1$

At act 548, the predicted failure instances are compared with actual failure instances in the fleet 505, 510, and 515. At act 550, the remaining fleet life is updated based on the comparison. Further, at act 560, coefficients of the accelerated degradation model are updated based on the comparison.

In an embodiment, the comparison is performed using machine learning algorithms. For example, a regression algorithm is used to infer relationships between the predicted failure instances and the actual failure instances.

In another embodiment, the comparison is performed using a non-linear neural network with input layers including the predicted failure instances and the actual failure instances. The output layers of the neural network output the comparison. The hidden layers of the neural network provide a non-linear relationship between the predicted failure instances and the actual failure instances. The non-linear relationship may be built by integrating linear correlations between the actual failure instances and the predicted failure instances. The acts 546 to 560 are repeated to accurately predict the remaining fleet life.

FIG. 6 illustrates a system 600 to perform the method of condition-based management of the fleet 505, 510, and 515. The system 600 includes a remote server 610 and a user device 620. The remote server 610 is communicatively coupled with the user device and the fleet 505, 510, and 515 via a network interface 650.

The system 600 also includes the first electro-mechanical system 680 and the apparatus 100 that is used to generate the accelerated degradation model. The accelerated degradation model is made available to the fleet 505, 510, and 515 via the network interface 650 and the server 610.

In an embodiment, the accelerated degradation model is generated on the server 610. The server 610 includes a communication unit 612, one or more processing units 614, and a memory 616. The memory 616 is configured to store computer program instructions defined by modules, (e.g., condition module 618).

In an embodiment, server 610 may also be implemented on a cloud computing environment, where computing resources are delivered as a service over the network 650. As used herein, "cloud computing environment" refers to a processing environment including configurable computing physical and logical resources, (e.g., networks, servers, storage, applications, services, etc.), and data distributed over the network 650, (e.g., the internet). The cloud computing environment provides on-demand network access to a shared pool of the configurable computing physical and logical resources. The network 650 may be a wired network, a wireless network, a communication network, or a network formed from any combination of these networks.

The processor 614 is configured to execute the condition module 618. Upon execution, the condition module 618 is configured to generate the accelerated degradation model based on the digital twin the first electro-mechanical system 680. In an embodiment, the condition module 618 is configured to predict failure instance in the first electro-mechanical system 680. In the embodiment, the apparatus 100 serves as a sensing unit while the processing is performed on the server 610. The accelerated degradation model is updated with actual failure instance in the first electro-mechanical system 680.

The accelerated degradation model is used by the fleet 505, 510, 515. The acts 542-560 are performed by the condition module 618 to predict the failure instances and the remaining fleet life of the fleet 505, 510, and 515.

In an embodiment, the condition module 618 includes machine learning algorithms that are used to automatically update the accelerated degradation model based on a fleet variability factor. The fleet variability factor refers to variation in the fleet 505, 510, and 515 with reference to the first electro-mechanical system 680. The fleet variability factor also includes variation in stress profiles and operation environment associated with each of the systems in the fleet 505, 510, and 515.

The remaining fleet life and the predicted failure instances of the fleet 505, 510, and 515 are displayed on the user device 620. The user device 620 may include a display unit 622 and a communication unit (not shown in FIG. 6). The predicted failure instances and the remaining fleet life are received by the user device via the communication unit and the network interface 650. In an embodiment, the user device 620 is a portable computing device such as a mobile phone.

Figure 7:
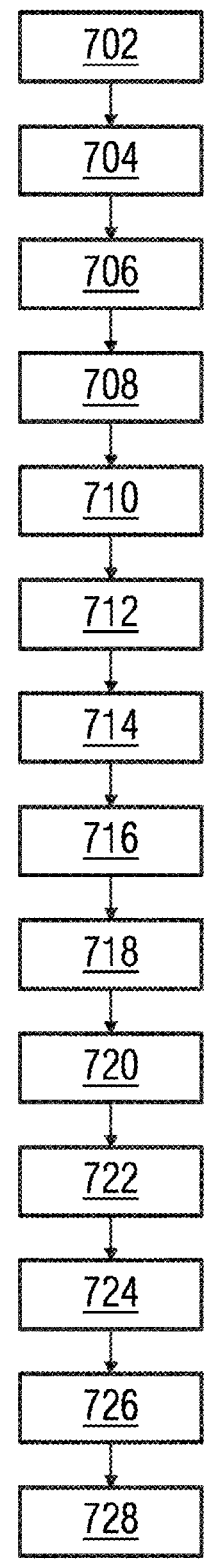
FIG. 7 is a flowchart of a method for condition-based management of one or more electro-mechanical systems, according to an embodiment.

FIG. 7 is a flowchart of a method 700 for condition-based management of one or more electro-mechanical systems, according to an embodiment.

At act 702, a stress profile for the electro-mechanical system is generated. The stress profile is generated based on operating or simulating operation of the electro-mechanical system in accordance with a load profile. The load profile indicative of operation duration and load capacity of the electro-mechanical system.

At act 704, condition data associated with the electro-mechanical system in operation is received from a plurality of sensing units.

At act 706, an accelerated-mechanical response from the electro-mechanical system is determined. The accelerated-mechanical response includes condition data that reflect a mechanical fault in the electro-mechanical system. The mechanical fault includes misalignment of components of the electro-mechanical system and/or loss of structural integrity of the components.

At act 708, an accelerated-electrical response from the electro-mechanical system is determined. The accelerated-electrical response includes the condition data that reflect an electric fault in the electro-mechanical system. The electric fault includes at least one of high voltage, low voltage, high current, electric phase unbalance, low current and short-circuit.

At act 710, an accelerated-process response from the electro-mechanical system is determined. The accelerated-process response includes the condition data that reflect a process fault due to overload of the electro-mechanical system.

At act 712, a digital twin of the electro-mechanical system is generated by computing a life probability distribution for the electro-mechanical system. Further, the digital twin is generated by determining a time-damage accumulation of electro-mechanical system based on historical condition data of the electro-mechanical system.

In an embodiment, the digital twin is generated using Weibull distribution and using inverse power law relationship. The scale parameter, n, of the Weibull distribution may be expressed as an inverse power function of stress V in the stress profile.

$$\eta(V) = \frac{1}{KV^n}$$

wherein: K and n are coefficients of the digital twin.

At act 714, simulation instances are generated by simulating the accelerated-mechanical response, the accelerated-electrical response, and the accelerated-process response on the digital twin of the electro-mechanical system.

At act 716, the accelerated degradation model is generated based on the simulation instances generated using the digital twin of the electro-mechanical system.

At act 718, a failure instance of the electro-mechanical system is predicted using the accelerated degradation model. The stress profile and the condition data are applied to the accelerated degradation model to predict the failure instances. In an embodiment, the failure instance is predicted by determining a fraction of the electro-mechanical system or its components that are failing with respect to time under the stress V.

If the electro-mechanical system is found to be able to survive the stress V, the failure instance is predicted based on age of the electro-mechanical system in terms of the hours operated under the stress V.

At act 720, an accelerated remaining life of the electro-mechanical system is predicted. The accelerated remaining life includes cycles to failure when the electro-mechanical system is operated above the rated stress.

At act 724, a remaining life is predicted based on the accelerated remaining life and physics of failure of the electro-mechanical system. The remaining life includes cycles to failure when the electro-mechanical system is operated within the rated stress. The remaining life may be determined using the equations provided in FIG. 5.

At act 726, comparing the predicted failure instance with an actual failure instance upon failure of the electro-mechanical system, for tuning the accelerated degradation model. Further, at act 726, coefficients of the accelerated degradation model are tuned based on the comparison of the predicted failure instance and the actual failure instance. In an embodiment, the comparison is perform using machine learning algorithms such as regression algorithm and genetic algorithm. For example, a regression algorithm is used to infer relationships between the predicted failure instances and the actual failure instances. Furthermore, at act 726, a new remaining life is predicted based on the tuned accelerated degradation model.

At act 728, a fleet life of a fleet of electro-mechanical systems is predicted using the accelerated degradation model. The act 728 includes updating the fleet life using a neural network based on variability between the electro-mechanical systems in the fleet.

The present disclosure may take a form of a computer program product including program modules accessible from computer-usable or computer-readable medium storing program code for use by or in connection with one or more computers, processors, or instruction execution system. For the purpose of this description, a computer-usable or computer-readable medium may be any apparatus that may contain, store, communicate, propagate, or transport the program for use by or in connection with the instruction execution system, apparatus, or device. The medium may be electronic, magnetic, optical, electromagnetic, infrared, or semiconductor system (or apparatus or device) or a propagation mediums in and of themselves as signal carriers are not included in the definition of physical computer-readable medium include a semiconductor or solid state memory, magnetic tape, a removable computer diskette, random access memory (RAM), a read only memory (ROM), a rigid magnetic disk, and optical disk such as compact disk read-only memory (CD-ROM), compact disk read/write, and DVD. Both processors and program code for implementing each aspect of the technology may be centralized or distributed (or a combination thereof) as known to those skilled in the art.

It is to be understood that the elements and features recited in the appended claims may be combined in different ways to produce new claims that likewise fall within the scope of the present disclosure. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present disclosure has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A computer implemented method of condition-based management of an electro-mechanical system, the method comprising:
generating a stress profile for the electro-mechanical system based on operating or simulating operation of the electro-mechanical system in accordance with a load profile, wherein the stress profile is indicative of a distribution of stress on the electro-mechanical system during operation or during simulation of the operation, wherein the distribution of stress is a distribution of electrical stress, mechanical stress, and process stress applied to the electro-mechanical system, and wherein the load profile is indicative of operation duration and load capacity of the electro-mechanical system;
receiving condition data associated with the electro-mechanical system in operation from a plurality of sensing units;
generating an accelerated degradation model using a digital twin of the electro-mechanical system when the electro-mechanical system is operated above a rated stress defined for the electro-mechanical system, wherein the digital twin comprises a cumulative damage model of the electro-mechanical system, wherein the cumulative damage model is formed by computing a life probability distribution for the electro-mechanical system and determining a time-damage accumulation of the electro-mechanical system based on historical condition data of the electro-mechanical system;
predicting a failure instance of the electro-mechanical system using the accelerated degradation model based on at least one of the stress profile and the condition data; and
comparing the predicted failure instance with an actual failure instance upon failure of the electro-mechanical system to tune the accelerated degradation model.

2. The method of claim 1, further comprising:
predicting a new remaining life of the electro-mechanical system based on the tuned accelerated degradation model.

3. The method of claim 2, further comprising:
predicting a fleet life of a fleet of electro-mechanical systems using the accelerated degradation model.

4. The method of claim 1, further comprising:
determining an accelerated-mechanical response from the electro-mechanical system,
wherein the accelerated-mechanical response comprises condition data that reflect a mechanical fault in the electro-mechanical system, and
wherein the mechanical fault comprises a misalignment of components of the electro-mechanical system, a loss of structural integrity of the components, or a combination thereof.

5. The method of claim 4, further comprising:
predicting a fleet life of a fleet of electro-mechanical systems using the accelerated degradation model.

6. The method of claim 1, further comprising:
determining an accelerated-electrical response from the electro-mechanical system,
wherein the accelerated-electrical response comprises condition data that reflect an electric fault in the electro-mechanical system, and
wherein the electric fault comprises a high voltage, a low voltage, a high current, a low current, a short-circuit, or a combination thereof.

7. The method of claim 6, further comprising:
predicting a fleet life of a fleet of electro-mechanical systems using the accelerated degradation model.

8. The method of claim 1, further comprising:
determining an accelerated-process response from the electro-mechanical system,
wherein the accelerated-process response comprises condition data that reflect a process fault due to overload of the electro-mechanical system.

9. The method of claim 8, further comprising:
predicting a fleet life of a fleet of electro-mechanical systems using the accelerated degradation model.

10. The method of claim 1, wherein the accelerated degradation model based on the digital twin is generated by:
simulating an accelerated-mechanical response, an accelerated-electrical response, and an accelerated-process response on the digital twin of the electro-mechanical system to generate simulation responses; and
predicting an accelerated remaining life of the electro-mechanical system based on the simulation responses.

11. The method of claim 1, further comprising:
predicting a fleet life of a fleet of electro-mechanical systems using the accelerated degradation model.

12. The method of claim 11, further comprising:
updating the fleet life based on variability between the electro-mechanical systems in the fleet,
wherein the fleet life is updated using a neural network.

13. An apparatus for condition-based management of an electro-mechanical system, the apparatus comprising:
one or more processing units; and
a memory communicative coupled to the one or more processing units, wherein the memory is configured, with the one or more processing units, to:
generate a stress profile for the electro-mechanical system based on operating or simulating operation of the electro-mechanical system in accordance with a load profile, wherein the stress profile is indicative of a distribution of stress on the electro-mechanical system during operation or during simulation of the operation, wherein the distribution of stress is a distribution of electrical stress, mechanical stress, and process stress applied to the electro-mechanical system, and wherein the load profile is indicative of operation duration and load capacity of the electro-mechanical system;
receive condition data associated with the electro-mechanical system in operation from a plurality of sensing units;
generate an accelerated degradation model using a digital twin of the electro-mechanical system when the electro-mechanical system is operated above a rated stress defined for the electro-mechanical system, wherein the digital twin comprises a cumulative damage model of the electro-mechanical system, wherein the cumulative damage model is formed by computing a life probability distribution for the electro-mechanical system and determining a time-damage accumulation of the electro-mechanical system based on historical condition data of the electro-mechanical system;
predict a failure instance of the electro-mechanical system using the accelerated degradation model based on at least one of the stress profile and the condition data; and
compare the predicted failure instance with an actual failure instance upon failure of the electro-mechanical system to tune the accelerated degradation model.

14. A system comprising:
one or more devices capable of providing condition data associated with condition of one or more electro-mechanical systems;
a server communicatively coupled to the one or more devices, wherein the server is configured to:
generate a stress profile for the one or more electro-mechanical systems based on operating or simulating operation of the one or more electro-mechanical systems in accordance with a load profile, wherein the stress profile is indicative of a distribution of stress on the or more electro-mechanical systems during operation or during simulation of the operation, wherein the distribution of stress is a distribution of electrical stress, mechanical stress, and process stress applied to the electro-mechanical system, and wherein the load profile is indicative of operation duration and load capacity of the one or more electro-mechanical systems;
receive condition data associated with the one or more electro-mechanical systems in operation from a plurality of sensing units;
generate an accelerated degradation model using a digital twin of the electro-mechanical system when the electro-mechanical system is operated above a rated stress defined for the electro-mechanical system, wherein the digital twin comprises a cumulative damage model of the electro-mechanical system, wherein the cumulative damage model is formed by computing a life probability distribution for the electro-mechanical system and determining a time-damage accumulation of the electro-mechanical system based on historical condition data of the electro-mechanical system;
predict a failure instance of the one or more electro-mechanical systems using the accelerated degradation model based on at least one of the stress profile and the condition data; and compare the predicted failure instance with an actual failure instance upon failure of the one or more electro-mechanical systems to tune the accelerated degradation model.

\* \* \* \* \*